United States Patent [19]

Saint-Dizier et al.

[11] 4,283,282

[45] Aug. 11, 1981

[54] FILTER HAVING VERTICAL FILTER ELEMENTS

[75] Inventors: Gilbert Saint-Dizier, Rueil Malmaison; Jean Le Fur, Garches; Robert Louboutin, Crespieres, all of France

[73] Assignee: Degremont, Malmaison, France

[21] Appl. No.: 140,794

[22] Filed: Apr. 16, 1980

[30] Foreign Application Priority Data

Apr. 20, 1979 [FR] France ................................. 79 10717

[51] Int. Cl.³ .............................................. B01D 29/32
[52] U.S. Cl. .................................. 210/236; 210/323.2
[58] Field of Search ................... 210/323 T, 236, 237, 210/232

[56] References Cited

U.S. PATENT DOCUMENTS

| | | | |
|---|---|---|---|
| 1,706,400 | 3/1929 | Diamond | 210/323.2 |
| 2,859,876 | 11/1958 | Brundage | 210/323.2 |
| 2,979,204 | 4/1961 | Yeiser | 210/236 |
| 3,017,032 | 1/1962 | Urdanoff | 210/236 |
| 3,252,577 | 5/1966 | Anderson | 210/236 |

FOREIGN PATENT DOCUMENTS 1440041  4/1966  France ................................. 210/323.2

Primary Examiner—Benoit Castel
Attorney, Agent, or Firm—Haseltine and Lake

[57] ABSTRACT

A filter has a vertically disposed housing, a support plate and vertical filter elements fixed at their upper ends to the support plate and supported thereby in the housing. A water outlet tube passes through the center of the support plate and exits at the base of the filter. The water outlet pipe is connected to the support plate in leak-tight manner and the portion of the filter located above the support plate is removable.

4 Claims, 2 Drawing Figures

FILTER HAVING VERTICAL FILTER ELEMENTS

BACKGROUND OF THE INVENTION

The present invention relates to filters having vertical filter elements, for example cartridge filters or candle-shaped filters as supports for a preliminary layer, which are used for the treatment of condensed water, particularly but not exclusively in the nuclear industry.

Known filters comprise a cylindrical housing having a vertical axis, which is closed at each end by a convex plate and in which a horizontal plate supporting a plurality of vertical cartridges or candles is disposed. These cartridges or candles are constituted by, for example, perforated hollow cylinders about which may be wound a sleeve of synthetic fiber which may receive a layer of material known as a preliminary layer for example ion exchange resin, diatomaceous earth, cellulose or active carbon, selected in terms of the water to be filtered. The water to be filtered is introduced at the base of the filter, penetrates inside the cartridges or candles and the treated water is collected by piping in the upper portion of the filter. Moreover, a vent is provided on the upper convex plate and provides an air drain.

These filters are used in the nuclear industry to treat radioactive water and are therefore disposed in a protective housing, generally of concrete, handling and dismounting of these filters being carried out at a distance through an orifice drilled in the protective housing. As the outlet piping for the air and the water in the upper part of the filter complicate such operations, access to the connection flanges is difficult.

In some filters the vertical filter elements are supported by a floor-plate disposed at the base of the filter above a water collection chamber for the treated water which is discharged at the lower portion of the filter. An air drain is, however, necessary in the upper portion of the filter. In addition, the dismounting of the filter elements requires the removal through the top, of the assembly in the housing above the floor-plate supporting the filter elements, which represents a considerable weight.

It is an object of this invention to provide a filter in an improved form.

SUMMARY OF THE INVENTION

According to the invention there is provided a filter comprising a vertically disposed housing, a support plate, vertical filter elements fixed at their upper ends to the support plate and supported thereby in the housing, a water outlet pipe passing through the center of the support plate and exiting at the base of the filter, means for connecting the support plate to the water outlet pipe in leak-tight manner, and means whereby the portion of the filter located above the support plate can be removed.

The support plate may be connected in a leak-tight manner to the water outlet piping by means of two flanges, one of which is fixed to the piping and the other to one end of a tie member, for example a bellows, fixed at its other end to the plate, an O ring interposed between the flanges, and locking clamps disposed within the piping and provided to urge the two flanges together.

The bellows support displacements due to the pressurization of the filter and/or pressure loss increases in the filter elements. The plate may be released by a simple operation, possibly from a distance, of the clamps which rock inside the piping. The plate may then be readily lifted with the filter elements and the compensation bellows. Re-positioning of the plate is carried out using the same method in the reverse order.

In a particular embodiment of the invention, the support plate and the upper portion of the filter carry castors disposed in at least two different planes and movable in guide rails fixed to a protective housing positioned around the filter. These castors and rails facilitate the displacement of the plate and the upper portion of the filter. In addition, they prevent any large-scale lateral movements during mounting of the plate and the upper portion of the filter as well as any risk of damage to the water outlet piping.

The guide rails may be adjusted in height by means of threaded rods and nuts, which enables the play between the rails and the castors to be adjusted. They are advantageously funnel-shaped in their upper portion and this facilitates the positioning of the plate and the upper portion of the filter, as these elements are automatically centered during their descent between the guide rails. Centering elements may be provided on the support plate and on the upper portion of the filter, which enables perfect positioning of the elements.

Preferably, a pipe forming an air passage is disposed in the water outlet pipe, and exits at its upper end near the upper end of the filter and at its lower end at the base of the filter.

DESCRIPTION OF THE DRAWINGS

The invention will now be more particularly described, by way of example, with reference to the accompanying drawings, wherein.

DESCRIPTION OF THE PREFERRED EMBODIMENT

Figure 1:
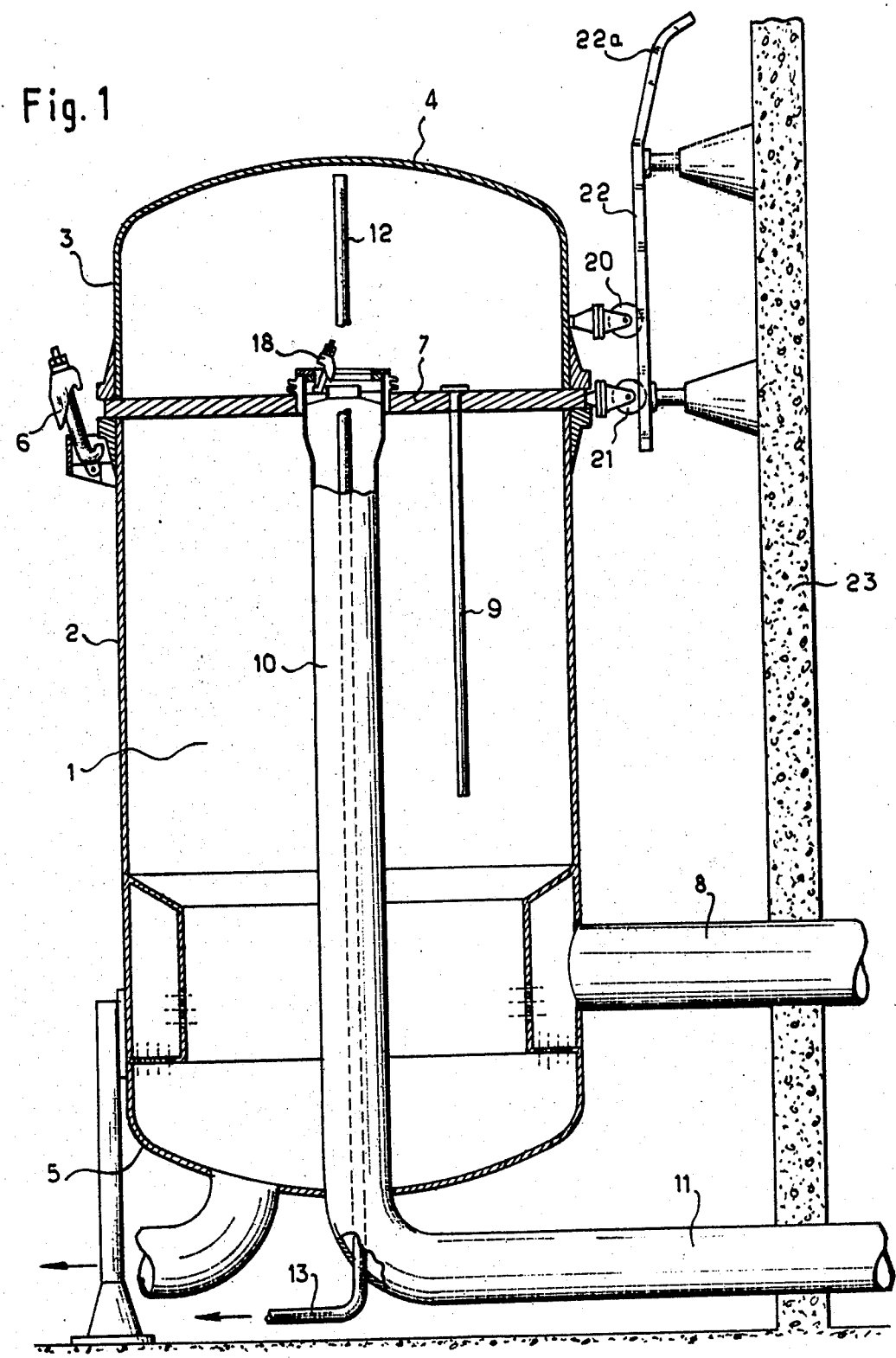
FIG. 1 is an axial section through one embodiment of a filter according to the invention.

Referring to the drawings, the filter shown therein comprises a cylindrical housing 1 having a vertical axis. The housing 1 is defined by a lower sleeve 2 and an upper sleeve 3, the volume of the sleeve 3 representing between one-fifth and one-third of the volume of the filter. The filter is closed by two convex plates 4 and 5. The two sleeves are fixed to one another by external locking clamps 6, with the interposition of a support plate 7. An inlet pipe 8 for water to be treated communicates with the lower portion of the filter. Vertical filter elements 9 are fixed to the support plate 7 by their upper ends, and extend downwardly into the lower portion of the filter.

A vertical pipe 10 for the outlet of the treated water passes through the center of the support plate 7. The pipe is fixed to the plate as described below and it emerges from the base of the filter as shown at 11. A pipe 12 disposed inside the pipe 10 and connecting the upper portion of the filter, in the vicinity of the plate 4, to a lower drain 13, forms an air drain.

Figure 2:
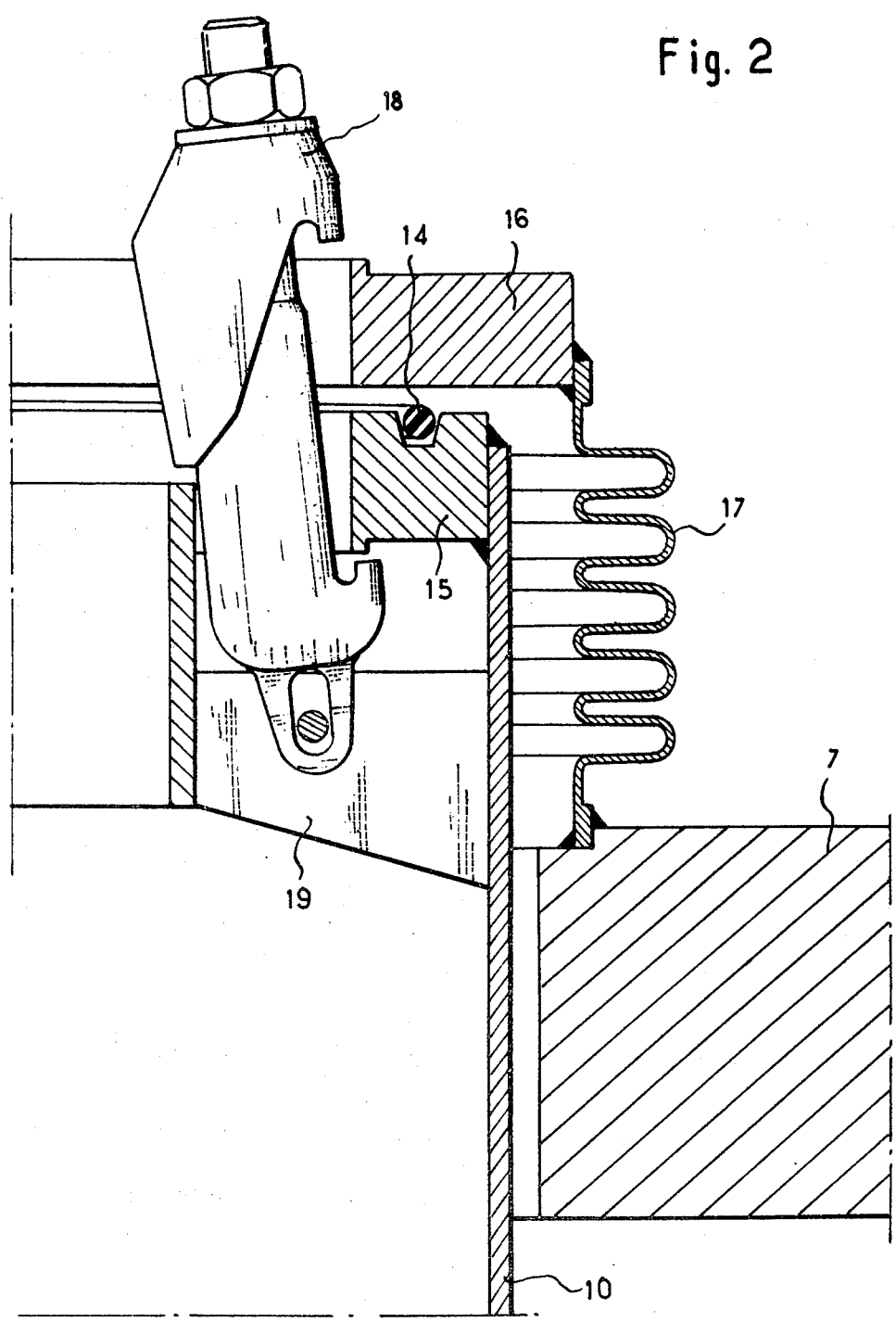
FIG. 2 shows a detail of the filter of FIG. 1.

The support plate 7 and the pipe 10 are fixed to one another in a leak-tight manner as shown in FIG. 2.

An O ring 14 is held between two flanges—a first lower flange 15 and a second upper flange 16. The flange 15 is welded to the water outlet pipe 10, and the flange 16 is welded to one of the ends of a metallic bellows 17 whose other end is welded to the plate 7 which supports the filter elements. The flanges 15 and 16 are clamped together by clamps 18 carried by supports 19 disposed inside the pipe 10.

The sleeve 3 and the edge of the support plate 7 have mounts 20 fixed thereto for movable castors 21 which are disposed in guide rails 22 distributed around the filter and fixed to a protective housing 23 in which the filter is disposed. The upper end 22a of the rails 22 is funnel-shaped. The filter which is described above may be readily dismounted, even by remote control. After the filter has been completely emptied, the sleeve 3 is unfastened from the sleeve 2 by unclamping of the clamps 6, then completely removed to enable access to the plate 7 which supports the filter elements 9. No pipes complicate this operation. The removal of the support plate 7 is carried out in two stages; the clamps 18 which ensure leak-tightness on the filtered water outlet pipe 10 are firstly unscrewed and swung inside this pipe; the plate 7 and the filter elements are then raised without difficulty. Mounting takes place in the reverse order and is facilitated by the guide rail assembly.

In a particular example a filter, 4.00 m in total height and 1.80 m in external diameter, is arranged with a plate supporting 570 candles of preliminary layer and disposed 0.865 m from the top of the filter. The support plate is connected to the water outlet pipe by leak-tight devices comprising six locking clamps. Four guide rails are fixed to the concrete housing protecting the filter. The assembly and re-assembly of the filter and the filter elements may be readily carried out by remote handling.

We claim:

1. A filter comprising a vertically disposed filter housing, a support plate, vertical filter elements fixed at their upper ends to the support plate and supported thereby in the housing, a water inlet in the lower portion of the filter, a water outlet pipe passing through the support plate and exiting at the base of the filter, two flanges connecting the support plate to the water outlet pipe in leak-tight manner, one of said flanges being fixed to the pipe and the other flange being fixed to one end of a bellows fixed at its other end to the plate, on O ring interposed between the flanges, and locking clamps disposed inside the pipe and provided to urge the two flanges together, a protective housing positioned around the filter housing, guide rails fixed to the protective housing, and castors carried by the support plate and the upper portion of the filter and being disposed in at least two different planes and movable in the guide rails.

2. A filter as claimed in claim 1, wherein the guide rails are funnel-shaped at their upper ends.

3. A filter as claimed in claim 1, wherein a pipe forming an air passage is disposed in the water outlet pipe and exits at its upper end near to the upper end of the filter and at its lower end at the base of the filter.

4. A filter as claimed in claim 1, wherein the plate is disposed so that the volume of the portion of the filter located above the plate represents between one-fifth and one-third of the total volume of the filter.

* * * * *